United States Patent Office 2,812,363
Patented Nov. 5, 1957

2,812,363

2-CHLOROPHENYL-3-METHYL-2,3-BUTANEDIOLS

Jack Mills, Glenns Valley, Ind., assignor to Eli Lilly and Company, Indianapolis, Ind., a corporation of Indiana No Drawing. Application October 31, 1956,
Serial No. 619,378

3 Claims. (Cl. 260—618)

This is a continuation-in-part of my co-pending United States patent application Serial No. 378,400, filed September 3, 1953, and now abandoned.

This invention relates to substituted butanediols. More particularly, it relates to chloro-substituted-phenyl-3-methyl-butanediols.

The novel butandiols of this invention, 2-p-chlorophenyl-3-methyl-2,3-butanediol and 2-m-chlorophenyl-3-methyl-2,3-butanediol, can be represented by the following formula

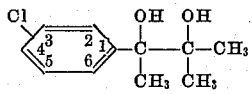

in which the chlorine is attached to the benzene ring at the 3- or 4-position.

The compounds are white, crystalline solids which are relatively water-insoluble. They are effective anticonvulsant agents when administered orally to persons subject to convulsive seizures of the petit mal type, and are also useful as tranquilizing agents. The compounds most conveniently are administered in the form of tablets or filled capsules, such being prepared by commonly employed procedures. A dosage regime of about 200 or 300 milligrams repeated 3 or 4 times a day generally produces the desired physiological effect in the average case.

The following examples illustrate the preparation and physical properties of the new compounds.

EXAMPLE 1

*Preparation of 2-p-chlorophenyl-3-methyl-2,3-butanediol*

To a mixture of 460 g. of p-chloroacetophenone, 350 ml. of ether and 500 ml. of water are added 410 g. of sodium cyanide, with vigorous stirring. The reaction mixture is cooled to about 5–10° C. and 700 ml. of concentrated hydrochloric acid are added at such a rate that no hydrogen cyanide is formed and the temperature of the mixture does not rise above 10° C. After the addition of the acid is complete, the reaction mixture is stirred for about three hours at room temperature, and allowed to separate into an aqueous and an organic phase. The organic phase is removed from the aqueous phase, and the aqueous phase and any salt which may have separated in the course of the reaction are washed with about 300 ml. of ether. The combined ether washings and organic phase are dried over anhydrous magnesium sulfate, and the ether is removed by evaporation in vacuo at room temperature. The residue is poured with stirring into 800 ml. of concentrated hydrochloric acid kept at about 0° C. by cooling with solid carbon dioxide. The acid mixture is saturated with gaseous hydrogen chloride at 0° C., and stirred at room temperature overnight. The resulting precipitate of p-chloroatrolactamide is removed by filtration, washed by slurrying with water and dried. After recrystallization from ethanol, p-choloratrolactamide melts at about 105–107° C.

A mixture of 200 g. of p-chloroatrolactamide and 1 l. of 25 percent sodium hydroxide solution is refluxed with stirring for about sixteen hours. The reaction mixture is then poured over cracked ice and diluted with water to a volume of about 3 l. The aqueous solution is washed with two 1 l. portions of ether, and acidified with concentrated hydrochloric acid, whereupon a precipitate of p-chloroatrolactic acid forms. The precipitated acid is removed by filtration, and is dissolved in 500 ml. of ether, washed with two 250 ml. portions of water and dried. The ether is removed by evaporation. p-Chloroatrolactic acid thus prepared melts at about 117–120° C.

A mixture of 185 g. of p-chloroatrolactic acid, 600 ml. of ethanol and 60 ml. of concentrated sulfuric acid is refluxed for about twelve hours. About half the solvent is then removed by evaporation in vacuo at room temperature, the residue is poured over cracked ice, and diluted with water to a volume of about 2 l. The ethyl p-chloroatrolactrate formed in the reaction is extracted with two 1 l. portions of ether. The combined ether extracts are washed with successive 200 ml. portions of water, 5 percent sodium carbonate solution, and water, and are dried over anhydrous magnesium sulfate. The dried ether solution is subjected to fractional distillation, and the fraction boiling at about 90–100° C. at a pressure of 0.1 mm. of mercury, is collected. The distillate consists of ethyl p-chloroatrolactrate.

To a solution of 2 mols of methylmagnesium iodide in 1.5 l. of ether are added with vigorous stirring 107 g. (0.5 mol) of ethyl p-chloroatrolactrate. The reaction mixture is stirred for about sixteen hours, and is then decomposed by the addition of about 320 ml. of saturated aqueous ammonium chloride solution. After standing, the ether layer is decanted from the mixture and the aqueous phase and the precipitated salts are washed with several 500 ml. portions of ether. The combined ether solution and washings are washed with successive 500 ml. portions of 5 percent ammonium chloride solution and water, are dried over anhydrous magnesium sulfate, and are evaporated to dryness in vacuo. The crystalline residue consisting of 2-p-chlorophenyl-3-methyl-2,3-butanediol, is recrystallized from a mixture of benzene and petroleum ether.

2-p-chlorophenyl-3-methyl-2,3-butanediol thus prepared melts at about 66–67° C.

*Analysis.*—Calculated for $C_{11}H_{15}ClO_2$: C, 61.53; H, 7.04. Found: C, 61.56; H, 7.14.

EXAMPLE 2

*Preparation of 2-p-chlorophenyl-3-methyl-2,3-butanediol*

A mixture consisting of 300 g. of red mercuric oxide, 4 l. of distilled water, and 250 ml. of concentrated sulfuric acid is heated to about 45° C. About 50 ml. of methylbutynol are added to the heated mixture, and thereafter a total of 8,330 g. of methylbutynol are added at such a rate that the temperature of the reaction mixture with external cooling applied, is maintained in the range 60–70° C. The reaction product comprising 2-methyl-butan-3-one-2-ol sulfate is hydrolyzed by heating the reaction mixture to about 90° C. for three and one-half hours. The reaction mixture is then allowed to stand at room temperature for about sixteen hours. The mercuric sulfate produced in the reaction is removed by filtration, and 1 l. of benzene is added to the filtrate. The water and benzene layers are stirred for about fifteen minutes and are allowed to settle. The benzene layer is decanted. The water layer is saturated with sodium sulfate, and is extracted twice with 500 ml. portions of benzene to remove an additional amount of reaction product. The benzene extracts are combined and are dried by distilling off a water-benzene azeotrope, the bulk of the benzene also being removed. The last traces of benzene are removed by evaporation in vacuo, and the residue remaining in the flask, comprising 2-methyl-2-hydroxybutan-3-one is distilled in vacuo. The fraction which boils at 69–81° C. at a pressure of about 90 mm. of mercury is collected. The refractive index of 2-methyl-2-hydroxybutan-3-one is as follows: $n_D^{25} = 1.4252 \pm 10$.

The following quantities of materials for preparing p-chlorophenyl magnesium bromide are placed in a 200-gallon still:

10,050 g. of magnesium turnings
20 gal. of anhydrous diethyl ether
5 lbs. of 1-bromo-4-chlorobenzene
1 oz. of iodine.

After the reaction forming the Grignard reagent has been initiated a solution of 165 pounds of 1-bromo-4-chlorobenzene in 30 gal. of anhydrous ether is added to the reaction mixture at such a rate sufficient to maintain the mixture at refluxing temperature. After the addition of the 1-bromo-4-chlorobenzene is complete, 17,544 g. of 2-methyl-2-hydroxybutan-3-one in 30 gal. of anhydrous diethyl ether are added, the addition being carried out at a rate to maintain the ether at refluxing temperature. The reaction mixture is then refluxed for one hour to insure completion of the reaction. The reaction mixture is allowed to stand for about sixteen hours, and is then poured into a mixture of 900 lbs. of ice and 254 lbs. of about 32 percent hydrochloric acid. The water layer is drawn off and discarded. The ether solution containing the 2-p-chlorophenyl-3-methyl-2,3-butanediol is decolorized with activated carbon, and is dried over sodium sulfate. The drying agent is removed by filtration, and the ether is evaporated in vacuo leaving a residue comprising 2-p-chlorophenyl-3-methyl-2,3-butanediol. The residue is heated to about 55° C., and 130 gal. of warm benzine (petroleum distillate boiling in the range of 60–80° C.) are added with stirring. This mixture is chilled, and crystalline precipitate of 2-p-chlorophenyl-3-methyl-2,3-butanediol which separates is removed by filtration, and is washed with cold benzine. The crystalline material is dissolved in about 16 gal. of benzene, is decolorized with activated carbon, and to the decolorized solution are added about 20 gal. of benzine. The mixture is cooled to about −5° C. to cause substantially complete crystallization of 2-p-chlorophenyl-3-methyl-2,3-butanediol. The crystalline of 2-p-chlorophenyl-3-methyl-2,3-butanediol is filtered off, is washed with 5 gal. of benzine, and is powdered and dried in vacuo. About 51 lbs. of recrystallized 2-p-chlorophenyl-3-methyl-2,3-butanediol are obtained.

EXAMPLE 3

*Preparation of 2-m-chlorophenyl-3-methyl-2,3-butanediol*

A Grignard reagent is prepared from 90 g. of m-bromochlorobenzene and 12 g. of magnesium turnings in 500 ml. of anhydrous ether. 21 g. of 2-methyl-2-hydroxybutan-3-one, provided by the method of Example 2 are added to the above Grignard reagent at a rate such as to maintain the ether at refluxing temperature. After the addition of 2-methyl-2-hydroxybutan-3-one is completed, the reaction mixture is stirred for about sixteen hours at ambient room temperature to insure more nearly complete formation of 2-m-chlorophenyl-3-methyl-2,3-butanediol. The reaction mixture is then poured into about 83 ml. of a saturated ammonium chloride solution to decompose the organomagnesium complexes. The organic layer containing the 2-m-chlorophenyl-3-methyl-2,3-butanediol is separated and is washed once with about 300 ml. of water. The organic layer is then dried and the ether is removed by evaporation in vacuo leaving a yellowish solid residue comprising 2-m-chlorophenyl-3-methyl-2,3-butanediol. This residue is recrystallized from a mixture of benzene and hexane. 2-m-chlorophenyl-3-methyl-2,3-butanediol thus prepared melts at about 82–83° C.

*Analysis.*—Calculated for $C_{11}H_{15}ClO_2$: C, 61.54; H, 7.04. Found: C, 61.18; H, 7.14.

I claim:

1. A compound selected from the group consisting of 2-m-chlorophenyl-3-methyl-2,3-butanediol and 2-p-chlorophenyl-3-methyl-2,3-butanediol.
2. 2-p-chlorophenyl-3-methyl-2,3-butanediol.
3. 2-m-chlorophenyl-3-methyl-2,3-butanediol.

References Cited in the file of this patent

UNITED STATES PATENTS 2,070,990    Groll et al. _____ Feb. 16, 1937

OTHER REFERENCES

Temnikova et al.: Chem. Abstracts, vol. 44 (1950), col. 4442–43 (2 pages).

Jour. Amer. Medical Assn., vol. 163, page facing page 519 (Feb. 16, 1957; 1 page).